No. 820,031. PATENTED MAY 8, 1906.
T. L. WILLSON.
PROCESS OF REDUCING CALCIUM OXID.
APPLICATION FILED JAN. 28, 1896.
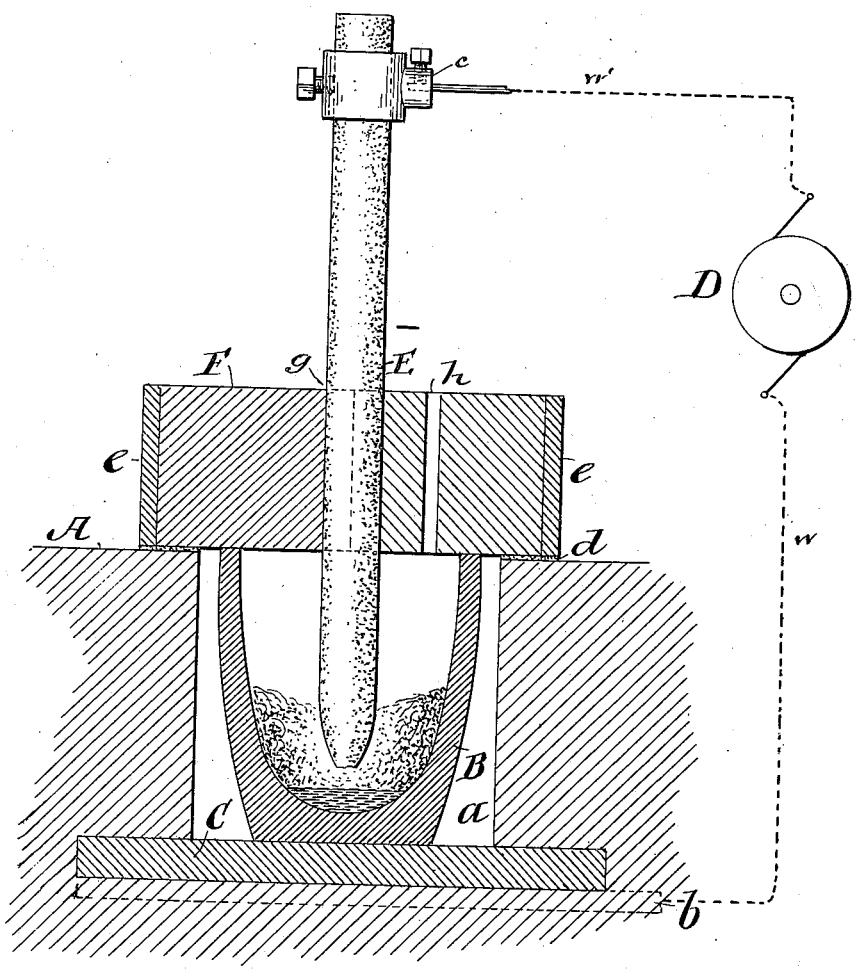
WITNESSES:
INVENTOR
Thomas L. Willson,
BY
ATTORNEYS.

UNITED STATES PATENT OFFICE.

THOMAS L. WILLSON, OF NEW YORK, N. Y., ASSIGNOR, BY MESNE ASSIGNMENTS, TO UNION CARBIDE COMPANY, A CORPORATION OF VIRGINIA.

PROCESS OF REDUCING CALCIUM OXID.

No. 820,031.   Specification of Letters Patent.   Patented May 8, 1906.

Application filed January 28, 1896. Serial No. 577,117.

*To all whom it may concern:*

Be it known that I, THOMAS L. WILLSON, a citizen of the United States, formerly of Brooklyn, Kings county, New York, but now residing in the city, county, and State of New York, have invented certain new and useful Improvements in the Processes of Reducing Calcium Oxid, of which the following is a specification.

My present invention aims to overcome the difficulties inherent in the practice of electric smelting of refractory metallic compounds by incandescence.

My invention is characterized by the utilization of the principle of heating the ores or metallic compounds by the employment of the electric arc in the presence of a reducing agent. It is well known that a much higher temperature is secured in the electric arc than in the heating of a poor conductor to incandescence by the passage of an electric current.

According to my invention I provide two electrodes of carbon—a lower one which may be hollowed or cup-shaped, as a crucible, and an upper one, preferably in the form of a pencil. For the lower electrode I employ, by preference, a carbon crucible placed on a conducting bed or plate of carbon, to which is joined one of the terminal wires of the electric circuit, the other wire being connected to the carbon pencil forming the other electrode. Preferably the positive terminal is connected to the carbon plate and thence to the cup-shaped electrode, making the latter the anode, and the negative terminal is connected to the carbon pencil, constituting the latter the cathode; but this is not essential.

This invention relates to the reduction of calcium oxid by the intense heat of the electric arc and the reducing action of carbon. The reduced metal may alloy or combine with some other metal or element, if present, and may combine with an excess of carbon to form a carbid.

The materials upon which I especially propose to work, as contemplated in this application, are calcium oxid and coke. I do not, however, limit myself to the use of crushed coke, as other forms of comminuted carbon may be employed—as, for instance, lamp-black or the ground-up waste fragments of retort-carbon.

In practical operation, as will be explained, the heat of the arc being retained and concentrated upon the work to be done, a reduction of the metallic oxid by the commingled carbon occurs, due to the high heat of the electric arc, and in some cases, and especially when the carbon is in excess, the highly-heated metal unites directly with the said carbon to form carbid.

The utilization of crushed coke is of special advantage as compared with hydrocarbons, in that there is less loss of heat in the treatment of such commingled coke than with a liquid or other hydrocarbon which has to be converted to carbon before the reduction of the metallic oxid is effected.

The practical application of my invention may be understood from the accompanying drawing, which is a vertical transverse section of a suitable furnace.

Let A designate a suitable hearth or bench of brickwork, constructed with an opening or recess $a$, of suitable size and shape, within which is set a crucible B. A carbon-plate C is built into the bench A and forms the bottom or floor of the opening $a$, so that the crucible rests on this plate. The brickwork immediately surrounding the opening $a$ should be constructed of fire-brick or other highly refractory material.

D designates the dynamo which of course may be of any suitable type adapted to generate a current of the requisite volume under suitable electromotive force and the respective terminals of which are connected with the carbon plate C and with a carbon pencil or electrode E. The connection with the carbon-plate is made, preferably, through the medium of a bar of metal $b$, as shown in dotted lines, to which the positive terminal of the wire $w$ is fastened. The connection of the carbon pencil E may be made by a clamp $c$, fastened on at its upper portion and formed with a binding-post into which the end of the other wire $w'$ is fastened.

The crucible B having been placed in the opening $a$, it is covered by placing over it a cover F, which may rest either on the top of the crucible or on the top of the brickwork A. A luting of fire-clay $d$ should be placed under this cover in order to prevent access of air to the crucible. The cover F may be two fire-bricks held between plates $e$. A cylindrical hole $g$ is formed vertically through the middle of the cover F and also a vent-opening $h$, which is preferably distinct from the hole $g$. The hole $g$ is made of such size as to admit the passage of the carbon pencil E through it with just sufficient friction to hold the carbon pencil at any height at which it may be placed.

The furnace may be operated for the reduction of calcium oxid in the following manner: I place in the crucible a suitable mixture, in a finely-divided condition, of calcium oxid and coke, the said coke being sufficient to reduce the calcium oxid. The vessel having been charged, the cover is then placed over the crucible and the carbon pencil E thrust through it and pressed down through the layer of material until its tip touches the lower electrode, or the carbon pencil may be first placed in position and the material to be reduced subsequently placed around it. The circuit connections being completed, an electric current is passed through the electrodes B and E. In a crucible containing about four or five pounds of material I have used two hundred amperes under an electromotive force of fifty volts. Of course if more material is used more amperes are to be employed. The carbon pencil E is then lifted slightly to strike the arc and higher until the maximum arc is formed. This adjustment may be either by hand or the furnace may be provided with automatic means for regulating the length of the arc by mechanism similar to the regulator of an arc-lamp. The fused product runs to the bottom, and the carbon pencil E is gradually lifted as the product accumulates. The pencil E should be fed up or down, as occasion requires, in order to maintain the desired arc. The freed gases escape through the vent-hole.

In the practice of my invention I aim to prevent as far as possible the wasting away of the carbon electrodes, since carbon in this form is an expensive fuel. In fact, it is the aim of my invention to avoid as far as possible all heating by combustion, the furnace being operated as nearly as possible by electric heat alone. To this end and because some oxidizable material is necessary in order to combine with the oxygen set free by the reduction of the ore I prefer to introduce into the crucible some cheaper form of carbon than that of which the electrodes are made. I have found the use of carbon in the form of lamp-black or crushed coke or the ground-up waste fragments of retort-carbon advantageous. By thus supplying carbon in this form the wasting away of the carbon pencil or cathode is reduced to almost nothing.

It is obvious that as the material is reduced additional material may be fed into the crucible, and it is also apparent that my process is advantageous, in that the material surrounding the arc protects the arc and saves its heat and concentrates it upon the work to be done.

I am aware that United States Patent No. 324,658, granted August 18, 1885, to E. H. and A. H. Cowles, describes and claims a process of producing alloys, bronzes, and metallic compounds, specifically aluminium-bronze, silicon-bronze, or boron-bronze, in which an ore is mixed with broken carbon and with an ore of an alloying metal or pieces of such metal and smelted. The patent states that the process is preferably carried out in a Cowles incandescent or resistance furnace, but that other electric furnaces may be employed—for example, the Siemens electric-arc furnace. The process described for the purpose of illustration is that of producing aluminium-bronze. An ore of aluminium is mixed with broken carbon and with an ore of copper or pieces of copper and smelted in an incandescent furnace, which is illustrated in the drawings. The aluminium is reduced and alloys with the reduced or melted copper. The patentees state that the same process may be practiced in the Siemens arc-furnace and that they either mix the ores or metals to be reduced together or alloyed or use an electrode of an alloying metal which is melted and alloys with the reduced metal.

I am also aware that an article by Dr. T. Sterry Hunt, published in *The Transactions of the American Institute of Mining Engineers*, Vol. 14, pages 492–5, states that E. H. and A. H. Cowles have employed the heat generated by the passage of an electric current through a resisting medium as a means of reducing in the presence of carbon the oxids not only of the alkaline metals, but of calcium, &c.

I am also aware that the *Journal of the Society of Telegraph Engineers*, Vol. 9, page 278, illustrates and describes the Siemens arc-furnace, including an automatic electromagnetic regulator for maintaining an arc of uniform resistance, and states that this regulator adjusts the arc to compensate for the sudden sinking or change in electrical resistance of the material undergoing fusion. The description also states that it is necessary to provide a non-destructible positive pole, such as platinum or iridium, when operating upon non-conductive earth or upon gases. The drawing of the furnace shows a suspended pole or electrode wholly out of contact with the contents of the crucible, the arc being sprung from the lower end of the electrode to the steel in the crucible.

What I claim as my invention, and desire to secure by Letters Patent, is—

1. The herein-described process of reducing calcium oxid by the action of carbon commingled therewith and the heat generated by an electric arc, which consists in establishing an electric arc between suitable poles, embedding the arc within a charge of calcium oxid and carbon, reducing portions of the charge, accumulating the product into a mass, thereafter employing said mass as one pole of the arc and maintaining the arc as the mass accumulates by gradually moving one of the poles of the arc, keeping unreduced portions of the charge around the arc, thereby retaining the heat of the arc and concentrating it upon the work to be done, and substantially excluding the air from the zone of reduction and permitting the escape of the gases produced by the reduction.

2. The herein-described process of reducing calcium oxid by the action of carbon commingled therewith and the heat generated by an electric arc, which consists in establishing an electric arc between suitable poles, one of said poles being the end of a carbon electrode, embedding the arc in a charge of calcium oxid and carbon, reducing portions of the charge, accumulating the product into a mass, thereafter employing said mass as one electrode and maintaining the arc between said mass and said carbon electrode by gradually moving one of said electrodes, keeping unreduced portions of the charge in contact with the carbon electrode and around the arc, thereby retaining the heat of the arc and concentrating it upon the work to be done, and substantially excluding the air from the zone of reduction and permitting the escape of the gases produced by the reduction.

3. The herein-described process of reducing calcium oxid by the action of carbon commingled therewith and the heat generated by an electric arc, which consists in establishing an electric arc between suitable poles, embedding the arc within a charge of calcium oxid and carbon, reducing portions of the charge, accumulating the product into a mass, thereafter employing said mass as one pole of the arc and maintaining the arc as the mass accumulates by gradually moving one of the poles of the arc, keeping unreduced portions of the charge around the arc and around the hot portions of said mass, thereby retaining the heat of the arc and concentrating it upon the work to be done, and substantially excluding the air from the zone of reduction and permitting the escape of the gases produced by the reduction.

4. The herein-described process of reducing calcium oxid by the action of carbon commingled therewith and the heat generated by an electric arc, which consists in establishing an electric arc between suitable poles, one of said poles being the end of a carbon electrode, embedding the arc in a charge of calcium oxid and carbon, reducing portions of the charge, accumulating the product into a mass, thereafter employing said mass as one electrode and maintaining the arc between said mass and said carbon electrode by gradually moving one of said electrodes, keeping unreduced portions of the charge in contact with the carbon electrode and around the arc and the hot portions of said mass, thereby retaining the heat of the arc and concentrating it upon the work to be done, and substantially excluding the air from the zone of reduction and permitting the escape of the gases produced by the reduction.

5. The herein-described process of reducing calcium oxid by the action of carbon commingled therewith and the heat generated by an electric arc, which consists in establishing an electric arc between suitable poles, one of said poles being the end of a depending carbon electrode, embedding the arc in a charge of calcium oxid and carbon, reducing portions of the charge, accumulating the product into a mass, thereafter employing said mass as one electrode and maintaining the arc between said mass and said depending carbon electrode by gradually moving one of said electrodes, keeping unreduced portions of the charge in contact with the depending carbon electrode and around the arc, thereby retaining the heat of the arc and concentrating it upon the work to be done, and substantially excluding the air from the zone of reduction and permitting the escape of the gases produced by the reduction.

6. The herein-described process of reducing calcium oxid by the action of carbon commingled therewith and the heat generated by an electric arc, which consists in establishing an electric arc between suitable poles, one of said poles being the end of a depending carbon electrode, embedding the arc in a charge of calcium oxid and carbon, reducing portions of the charge, accumulating the product into a mass, thereafter employing said mass as one electrode and maintaining the arc between said mass and said depending carbon electrode by gradually moving one of said electrodes, keeping unreduced portions of the charge in contact with the depending carbon electrode and around the arc and the hot portions of said mass, thereby retaining the heat of the arc and concentrating it upon the work to be done, and substantially excluding the air from the zone of reduction and permitting the escape of the gases produced by the reduction.

7. The herein-described process of continuously reducing calcium oxid by the action of carbon commingled therewith and the heat generated by an electric arc, which consists in establishing an electric arc between suitable poles, embedding the arc within a charge of calcium oxid and carbon, reducing portions of the charge, accumulating the product into a mass, thereafter employing said mass as one pole of the arc and maintaining the arc as the mass accumulates by gradually moving one of the poles of the arc, feeding in additional material as required and keeping unreduced portions of the charge around the arc, thereby retaining the heat of the arc and concentrating it upon the work to be done, and substantially excluding the air from the zone of reduction and permitting the escape of the gases produced by the reduction.

8. The herein-described process of continuously reducing calcium oxid by the action of carbon commingled therewith and the heat generated by an electric arc, which consists in establishing an electric arc between suitable poles, one of said poles being the end of a carbon electrode, embedding the arc in a charge of calcium oxid and carbon, reducing portions of the charge, accumulating the product into a mass, thereafter employing said mass as one electrode and maintaining the arc between said mass and said carbon electrode by gradually moving one of said electrodes, feeding in additional material as required and keeping unreduced portions of the charge in contact with the carbon electrode and around the arc, thereby protecting said electrode and retaining the heat of the arc and concentrating it upon the work to be done, and substantially excluding the air from the zone of reduction and permitting the escape of the gases produced by the reduction.

9. The herein-described process of continuously reducing calcium oxid by the action of carbon commingled therewith and the heat generated by an electric arc, which consists in establishing an electric arc between suitable poles, one of said poles being the end of a depending carbon electrode, embedding the arc in a charge of calcium oxid and carbon, reducing portions of the charge, accumulating the product into a mass thereafter employing said mass as one electrode and maintaining the arc between said mass and said depending carbon electrode by gradually moving one of said electrodes, feeding in additional material as required and keeping unreduced portions of the charge in contact with the depending carbon electrode and around the arc and the hot portions of said mass, thereby protecting said electrode and mass, retaining the heat of the arc and concentrating it upon the work to be done, and substantially excluding the air from the zone of reduction and permitting the escape of the gases produced by the reduction.

10. The herein-described process of producing calcium carbid, which consists in establishing an electric arc between suitable poles, embedding the arc within a charge of calcium oxid and carbon, using suitable proportions for the production of calcium carbid, reducing portions of the charge, accumulating the carbid into a mass, thereafter employing said mass as one pole of the arc and maintaining the arc as the mass accumulates by gradually moving one of the poles of the arc, keeping unreduced portions of the charge around the arc, thereby retaining the heat of the arc and concentrating it upon the work to be done, and substantially excluding the air from the zone of reduction and permitting the escape of the gases produced by the reduction.

11. The herein-described process of producing calcium carbid, which consists in establishing an electric arc between suitable poles, one of said poles being the end of a carbon electrode, embedding the arc in a charge of calcium oxid and carbon, using suitable proportions for the production of calcium carbid, reducing portions of the charge, accumulating the carbid into a mass, thereafter employing said mass as one electrode and maintaining the arc between said mass and said carbon electrode by gradually moving one of said electrodes, keeping unreduced portions of the charge in contact with the carbon electrode and around the arc, thereby retaining the heat of the arc and concentrating it upon the work to be done, and substantially excluding the air from the zone of reduction and permitting the escape of the gases produced by the reduction.

12. The herein-described process of producing calcium carbid, which consists in establishing an electric arc between suitable poles, embedding the arc within a charge of calcium oxid and carbon, using suitable proportions for the production of calcium carbid, reducing portions of the charge, accumulating the carbid into a mass, thereafter employing said mass as one pole of the arc and maintaining the arc as the mass accumulates by gradually moving one of the poles of the arc, keeping unreduced portions of the charge around the arc and around the hot portions of said mass, thereby retaining the heat of the arc and concentrating it upon the work to be done, and substantially excluding the air from the zone of reduction and permitting the escape of the gases produced by the reduction.

13. The herein-described process of producing calcium carbid, which consists in establishing an electric arc between suitable poles, one of said poles being the end of a carbon electrode, embedding the arc in a charge of calcium oxid and carbon, using suitable proportions for the production of calcium carbid, reducing portions of the charge, accumulating the carbid into a mass, thereafter employing said mass as one electrode and maintaining the arc between said mass and said carbon electrode by gradually moving one of said electrodes, keeping unreduced portions of the charge in contact with the carbon electrode and around the arc and the hot portions of said mass, thereby retaining the heat of the arc and concentrating it upon the work to be done, and substantially excluding the air from the zone of reduction and permitting the escape of the gases produced by the reduction.

14. The herein-described process of producing calcium carbid, which consists in establishing an electric arc between suitable poles, one of said poles being the end of a depending carbon electrode, embedding the arc in a charge of calcium oxid and carbon, using suitable proportions for the production of calcium carbid, reducing portions of the charge, accumulating the carbid into a mass, thereafter employing said mass as one electrode and maintaining the arc between said mass and said depending carbon electrode by gradually moving one of said electrodes, keeping unreduced portions of the charge in contact with the depending carbon electrode and around the arc, thereby retaining the heat of the arc and concentrating it upon the work to be done, and substantially excluding the air from the zone of reduction and permitting the escape of the gases produced by the reduction.

15. The herein-described process of producing calcium carbid, which consists in establishing an electric arc between suitable poles, one of said poles being the end of a depending carbon electrode, embedding the arc in a charge of calcium oxid and carbon, using suitable proportions for the production of calcium carbid, reducing portions of the charge, accumulating the carbid into a mass, thereafter employing said mass as one electrode and maintaining the arc between said mass and said depending carbon electrode by gradually moving one of said electrodes, keeping unreduced portions of the charge in contact with the depending carbon electrode and around the arc and the hot portions of said mass, thereby retaining the heat of the arc and concentrating it upon the work to be done, and substantially excluding the air from the zone of reduction and permitting the escape of the gases produced by the reduction.

16. The herein-described process of producing calcium carbid, which consists in establishing an electric arc between suitable poles, embedding the arc within a charge of calcium oxid and carbon, using suitable proportions for the production of calcium carbid, reducing portions of the charge, accumulating the carbid into a mass, thereafter employing said mass as one pole of the arc and maintaining the arc as the mass accumulates by gradually moving one of the poles of the arc, feeding in additional material as required and keeping unreduced portions of the charge around the arc, thereby retaining the heat of the arc and concentrating it upon the work to be done, and substantially excluding the air from the zone of reduction and permitting the escape of the gases produced by the reduction.

17. The herein-described process of producing calcium carbid, which consists in establishing an electric arc between suitable poles, one of said poles being the end of a carbon electrode, embedding the arc in a charge of calcium oxid and carbon, using suitable proportions for the production of calcium carbid, reducing portions of the charge, accumulating the carbid into a mass, thereafter employing said mass as one electrode and maintaining the arc between said mass and said carbon electrode by gradually moving one of said electrodes, feeding in additional material as required and keeping unreduced portions of the charge in contact with the carbon electrode and around the arc, thereby protecting said electrode and retaining the heat of the arc and concentrating it upon the work to be done, and substantially excluding the air from the zone of reduction and permitting the escape of the gases produced by the reduction.

18. The herein-described process of producing calcium carbid, which consists in establishing an electric arc between suitable poles, one of said poles being the end of a depending carbon electrode, embedding the arc in a charge of calcium oxid and carbon, using suitable proportions for the production of calcium carbid, reducing portions of the charge, accumulating the carbid into a mass, thereafter employing said mass as one electrode and maintaining the arc between said mass and said depending carbon electrode by gradually moving one of said electrodes, feeding in additional material as required and keeping unreduced portions of the charge in contact with the depending carbon electrode and around the arc and the hot portions of said mass, thereby protecting said electrode and mass, retaining the heat of the arc and concentrating it upon the work to be done, and substantially excluding the air from the zone of reduction and permitting the escape of the gases produced by the reduction.

In witness whereof I have hereunto signed my name in the presence of two subscribing witnesses.

THOMAS L. WILLSON.

Witnesses:
ARTHUR C. FRASER,
GEORGE H. FRASER.